United States Patent Office 2,785,974
Patented Mar. 19, 1957

2,785,974

PROCESS FOR PRODUCING METAL CERAMIC COMPOSITIONS

Norman Clement Moore, Caswell, Greens Norton, England, assignor to The Plessey Company Limited, Ilford, England, a British company No Drawing. Application July 9, 1952,
Serial No. 297,975

4 Claims. (Cl. 75—206)

This invention relates to ceramic compositions and particularly to ceramic compositions which contain free chromium metal.

It is well known that fused alumina ($Al_2O_3$) is a valuable refractory material for use at high temperatures and it is also well known that binary systems of alumina and chromic oxide ($Cr_2O_3$) are also of value in this connection. Such binary systems indeed exist naturally in the chrome ores, other constituents also usually being present. Thus a dilute solid solution of chromic oxide in alumina exists as natural ruby and it has been shown (Bureau of Standards Journal of Research 6 (6), 9,470,949, item RP 317, 1931) that solid solutions are obtained with all relative proportions of chromic oxide and alumina, no identifiable chemical compounds being formed.

An object of the invention is to provide processes for the production of ceramic materials which consist of fired alumina, or fired solid solutions of alumina and chromic oxide, which have dispersed therethrough particles of chromium of microscopic dimensions.

More particularly according to this invention there are provided novel ceramic materials of the type just defined in which the main constituent is fused alumina containing at most only a small proportion e. g. up to 5% of chromic oxide, and a proportion of metallic chromium of the order of 10 to 50% or more, e. g. up to 70% by weight of the product.

Such ceramic materials are excellent refractories of very good mechanical strength and possess, as compared with fused alumina itself, a substantially improved resistance to thermal shock.

Ceramic materials of the character just defined are produced by forming a mixture of alumina and chromic oxide, adding thereto a quantity of carbon sufficient to react with part or all of the chromic oxide to reduce the same to chromium metal and subjecting the composition to a temperature at which the carbon and chromic oxide react to reduce the chromic oxide, or part of it, to chromium metal. The carbon is itself converted to oxides of carbon which are removed at the temperature prevailing. In order to facilitate removal of such oxides of carbon the heat treatment is preferably effected at reduced pressure.

The initial mixture may be made by various methods. Thus the chromic oxide, alumina and carbon may be milled together and the resulting mixture subjected to the fusion treatment. In another method solutions of soluble salts e. g. chlorides of chromium and aluminium may be treated to co-precipitate the hydroxides of chromium and aluminium, these hydroxides may be converted to the corresponding oxides by heat treatment and the resulting composition mixed with carbon and then fused. In a third method a solid solution of chromic oxide and alumina may be made by fusing these ingredients together in the selected proportions, and the fusion mixture (a solid solution) cooled, pulverised and mixed with carbon. Of these methods the first is preferred from the standpoint of simplicity, the chromic oxide, alumina and carbon, in the selected proportions being mixed and pulverised in a pebble mill, the mixture compacted into the required shape under pressure, and then heated to induce the reaction between the carbon and the chromic oxide to take place.

The following example will serve to illustrate the invention:

*Example I*

There were mixed, in a pebble mill, the following materials:

| | Parts by weight |
|---|---|
| Chromic oxide | 28 |
| Alumina | 80 |
| Carbon | 7 |

The mixture was compacted to the required shape at a pressure of 5 tons per square inch and was then introduced into a furnace, evacuated to a pressure of 0.03 mm. of mercury and brought to a temperature of 1100° C. (at which temperature the pressure rises to about 0.1 mm. of mercury). The reaction was thus completed before solid solution occurred.

The product thus obtained had a chalk-like consistency and could be readily machined to any desired shape.

By heating to 1600° C. a further hardening took place to produce a sintered product of negligible porosity. It was found to be substantially unaffected by treatment in an oxidising atmosphere for 100 hours at 1200° C., and had a breaking strength at this temperature of about 20,000 lbs./square inch. It was appreciably superior to sintered alumina in its resistance to thermal shock. Its composition was:

| | Parts by weight |
|---|---|
| Chromium metal | 16 |
| Alumina | 80 |
| Chromic oxide | 4 | the chromium metal existing as particles of microscopic size throughout the body of the material.

The technique described in the foregoing example in which the chalk-like product first produced is machined to shape and then returned to the furnace for sintering is especially advantageous where the desired pre-shaping of the mass by a pressing tool is difficult or impossible.

It is to be understood that the ceramic compositions of this invention may contain minor proportions of other oxides commonly present in refractory materials, e. g. the oxides of silicon, iron, magnesium, calcium or zirconium.

The foregoing Example I may be modified by varying the proportions of the initial ingredients to afford sintered materials of the composition set forth in the following examples:

*Example II*

| | Parts by weight |
|---|---|
| Chromium metal | 35.2 |
| Alumina | 63.0 |
| Chromic oxide | 1.8 |

*Example III*

| | Parts by weight |
|---|---|
| Chromium metal | 57.7 |
| Alumina | 40.3 |
| Chromic oxide | 2.0 |

*Example IV*

| | Parts by weight |
|---|---|
| Chromium metal | 25.5 |
| Alumina | 71.0 |
| Chromic oxide | 3.5 |

Example V

| | Parts by weight |
|---|---|
| Chromium metal | 41.0 |
| Alumina | 55.9 |
| Chromic oxide | 3.1 |

I claim:
1. Process for the production of a metal ceramic product characterised by mechanical strength and resistance to thermal shock, comprising forming a mixture of alumina in an amount between 20 to 85% by weight and chromic oxide in an amount between 15 and 80% by weight, adding a determined amount of carbon to said mixture, and then heating the mixture at a sufficiently high temperature and for a sufficient time to cause reaction of all the added carbon with chromic oxide and to form a sintered product having dispersed therethrough particles of metallic chromium of microscopic dimensions, the amount of added carbon being determined such that the sintered product contains not more than 5% of chromic oxide and between 10% and 70% of metallic chromium.
2. Process according to claim 1 wherein the mixture of alumina and chromic oxide is formed by co-precipitating from a solution the hydroxides of aluminium and chromium, and heating the mixture of said hydroxides to convert it to an intimate mixture of the oxides.
3. Process according to claim 1 wherein the mixture of alumina and chromic oxide is produced by fusing a mixture of these oxides to form a solid solution, and pulverising said solid solution.
4. Process according to claim 1 wherein the heating is effected under sub-atmospheric pressure.

References Cited in the file of this patent

UNITED STATES PATENTS

| | | |
|---|---|---|
| 1,720,000 | Ramage | July 9, 1929 |
| 1,826,456 | Comstock | Oct. 6, 1931 |
| 1,826,457 | Comstock | Oct. 6, 1931 |
| 2,224,595 | Dawihl | Dec. 10, 1940 |
| 2,261,196 | Wellman | Nov. 4, 1941 |
| 2,382,338 | Shobeet | Aug. 14, 1945 |
| 2,404,598 | Sachsee | July 23, 1946 |
| 2,698,990 | Conant | Jan. 11, 1955 |

FOREIGN PATENTS

| | | |
|---|---|---|
| 349,587 | Great Britain | May 26, 1931 |
| 676,441 | Great Britain | July 30, 1952 |